United States Patent
Freissle et al.

(10) Patent No.: US 11,458,506 B2
(45) Date of Patent: Oct. 4, 2022

(54) MONITORING SYSTEMS AND METHODS FOR SCREENING SYSTEM

(71) Applicant: Polydeck Screen Corporation, Spartanburg, SC (US)

(72) Inventors: Peter Freissle, Spartanburg, SC (US); Hans R. Tanner, Spartanburg, SC (US); Ryan W. Johnson, Moore, SC (US)

(73) Assignee: POLYDECK SCREEN CORPORATION, Spartanburg, SC (US)

( * ) Notice: Subject to any disclaimer, the term of this patent is extended or adjusted under 35 U.S.C. 154(b) by 281 days.

(21) Appl. No.: 16/715,419

(22) Filed: Dec. 16, 2019

(65) Prior Publication Data
US 2020/0188958 A1 Jun. 18, 2020

Related U.S. Application Data

(60) Provisional application No. 62/781,170, filed on Dec. 18, 2018.

(51) Int. Cl.
*B07B 1/46* (2006.01)
*B07B 1/42* (2006.01)
(Continued)

(52) U.S. Cl.
CPC .............. *B07B 1/4645* (2013.01); *B07B 1/42* (2013.01); *H04B 17/318* (2015.01); *H04W 4/80* (2018.02)

(58) Field of Classification Search
CPC ....... B07B 1/4645; B07B 1/42; B07B 1/4627; B07B 13/18; H04B 17/318; H04B 17/23; H04W 4/80
(Continued)

(56) References Cited

U.S. PATENT DOCUMENTS 3,834,534 A  9/1974 Peterson et al.
3,963,605 A  6/1976 Seaboum
(Continued)

FOREIGN PATENT DOCUMENTS

WO  WO 2014/136121        9/2014
WO  WO-2014136121 A1 *  9/2014  ............... B07B 1/42

OTHER PUBLICATIONS

PCT International Search Report, and Written Opinion for corresponding PCT Application No. PCT/US2019/066520, dated Feb. 20, 2020, 11 pages.

*Primary Examiner* — Gene O Crawford
*Assistant Examiner* — Muhammad Awais
(74) *Attorney, Agent, or Firm* — Dority & Manning, P.A.

(57) ABSTRACT

Systems and methods associated with screening systems are provided. In one example implementation, a screening system has a plurality of screen panels. Each of the screen panels define a screening surface with one or more apertures configured to separate material. The system includes a panel node associated with each of the plurality of screen panels. The system includes a controller node associated with the screening system. The controller node is operable to communicate with each panel node. Each panel node can include one or more sensing elements. The panel node further comprises a communication circuit configured to wirelessly communicate information to the controller node.

20 Claims, 10 Drawing Sheets

(51) Int. Cl.
*H04B 17/318* (2015.01)
*H04W 4/80* (2018.01)

(58) Field of Classification Search
USPC .......................................................... 209/363
See application file for complete search history.

(56) References Cited

U.S. PATENT DOCUMENTS

| | | |
|---|---|---|
| 6,543,620 B2 | 4/2003 | Allaei |
| 6,698,593 B1 | 3/2004 | Folke et al. |
| 6,997,325 B2 | 2/2006 | DeCenso |
| 7,143,007 B2 | 11/2006 | Long et al. |
| 7,182,207 B2 | 2/2007 | DeCenso |
| 7,343,827 B2 | 3/2008 | Biggs |
| 7,461,972 B2 | 12/2008 | Cohen |
| 7,484,625 B2 | 2/2009 | Scott et al. |
| 7,492,254 B2 | 2/2009 | Bandy et al. |
| 8,330,610 B2 | 12/2012 | Freissle et al. |
| 2009/0301945 A1 | 12/2009 | Trench et al. |
| 2010/0231396 A1* | 9/2010 | Tump .................... B07B 1/4627 340/652 |
| 2011/0285541 A1* | 11/2011 | Freissle ................ B07B 1/4645 209/370 |
| 2012/0125736 A1 | 5/2012 | Twigger et al. |
| 2014/0266682 A1* | 9/2014 | Gettings ............ G06Q 10/0635 340/517 |
| 2016/0052022 A1* | 2/2016 | Dahl ..................... B07B 1/4627 209/408 |
| 2016/0332199 A1* | 11/2016 | Schuetz ................ B07B 1/4609 |
| 2018/0268278 A1* | 9/2018 | Spinks ................... G06K 19/04 |

* cited by examiner

MONITORING SYSTEMS AND METHODS FOR SCREENING SYSTEM

PRIORITY CLAIM

The present application claims the benefit of priority of U.S. Provisional Application Ser. No. 62/781,170, titled "Monitoring Systems and Methods for Screening System," filed on Dec. 18, 2018, which is incorporated herein by reference.

FIELD

The present disclosure relates generally to screening systems.

BACKGROUND

Screening systems are used in the mining and other industries to size and separate desired materials from less desired materials. Certain screening systems include modular screening systems which are composed of a plurality of modular and replaceable screening media (e.g., screen panels) mounted to a support frame. The screening media includes a plurality of apertures dimensioned to separate the desired material from less desired material.

Screening media can include modular screen panels which are removably mountable to a support frame. The individual screen panels can be constructed of a frame or insert that is encapsulated by a resilient material, such as a polymeric material, such as polyurethane or rubber. The individual screen panels can be mounted to the support frame and subjected to intense vibrations during the screening process. As materials are passed over the surface of the screen panels, desired materials pass through the apertures of the screen panels.

SUMMARY

Aspects and advantages of embodiments of the present disclosure will be set forth in part in the following description, or may be learned from the description, or may be learned through practice of the embodiments.

Example aspects of the present disclosure are directed to a screening system having a plurality of screen panels. Each of the screen panels define a screening surface with one or more apertures configured to separate material. The system includes a panel node associated with each of the plurality of screen panels. The system includes a controller node associated with the screening system. The controller node is operable to communicate with each panel node. Each panel node can include one or more sensing elements. The panel node further comprises a communication circuit configured to wirelessly communicate information to the controller node.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
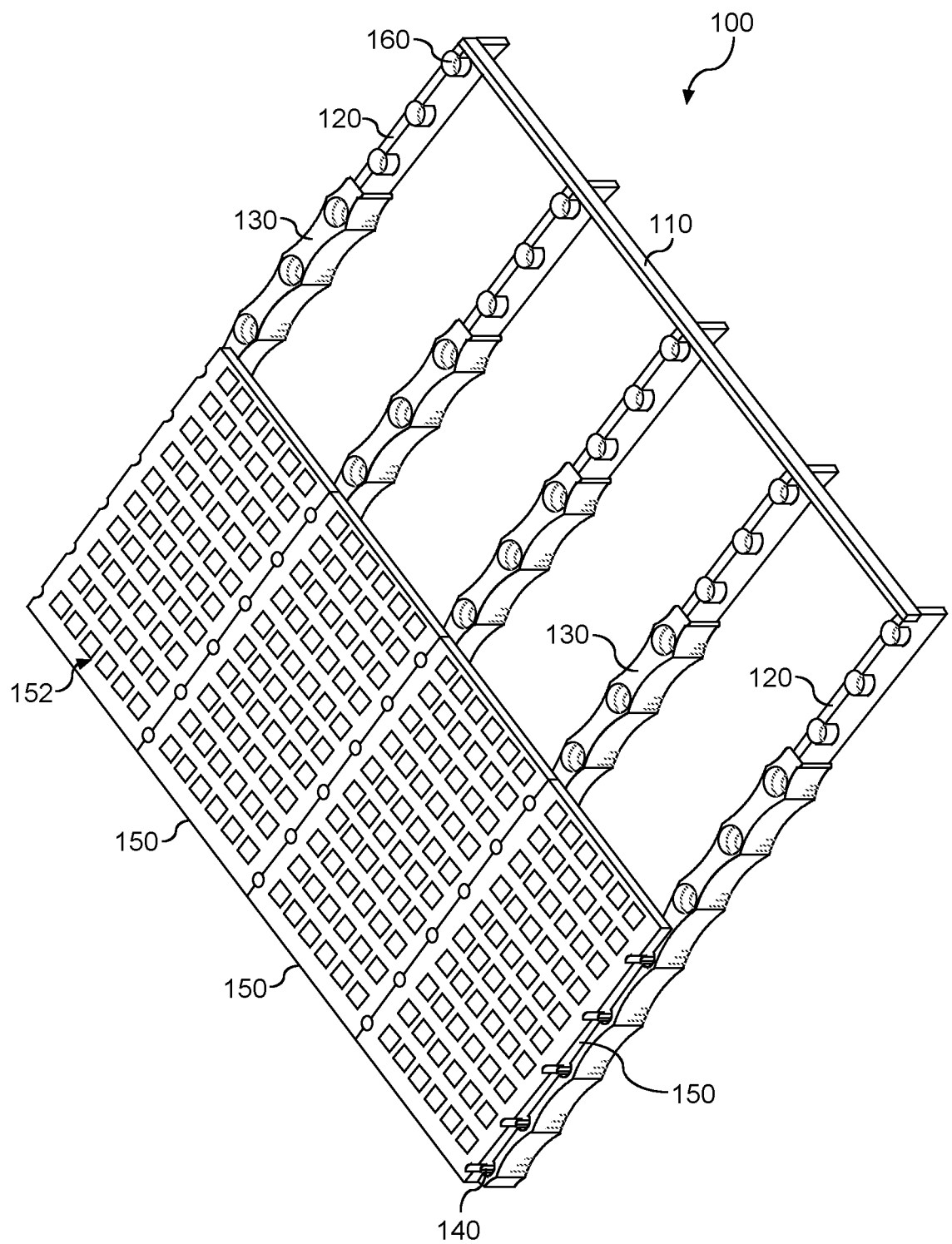
FIG. 1 depicts an example screening system.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to screening systems. More particularly, example aspects of the present disclosure are directed to monitoring systems and methods for monitoring various aspects of a screening system, such as modular screening systems. Modular screening systems can include modular screen panels which are removably mountable to a support frame. The individual screen panels can be constructed of a frame or insert that is encapsulated by a resilient material, such as a polymeric material, such as polyurethane or rubber. The individual screen panels can be mounted to the support frame and subjected to intense vibrations during the screening process. As materials are passed over the surface of the screen panels, desired materials pass through the apertures of the screen panels.

The intense vibrations from the screening process combined with the abrasiveness of the mined materials can lead to wear in outer surfaces of the screen panels. Eventually, the wear in the outer surfaces of the screen panels can affect the size of the apertures in the screen panel and allow material of larger size to break through the screen panel so as to contaminate the material intended to pass through the screen panel. This breakthrough and contamination can result in mechanical problems in subsequent process steps, leading to repair costs and down time. In addition, the screen panels can become loose or dislodged.

Preventive maintenance in the form of planned or scheduled replacement of screen panels based on past use and replacement statistics can result in premature replacement of screen panels, leading to additional waste and costs. Planned or scheduled replacement also ignores cases of unusual wear. Moreover, the problem of breakthrough can be so severe in certain circumstances that only reasonable guessing or detailed inspection of the screening arrangement when not in use can be applied, neither of which is cost effective.

Example aspects of the present disclosure are directed to a monitoring system for a screening system. In some embodiments, the screening system can include a panel node associated with each of the plurality of screen panels in the screening system. The panel node can be embedded in and/or attached to the screen panel. The panel node can include and/or can be coupled to one or more sensing elements configured to generate signals associated with the screen panel, such as signals associated with a level of wear of the screen panel, signals associated with motion of the screen panel (e.g., accelerometers, vibration sensors, etc.), signals associated with the panel becoming loose, and/or environmental conditions (e.g., temperature sensors, etc.).

The panel node can include a communication circuit configured to communicate wireless signals to remote devices. For instance, the panel node can include a Bluetooth Low Energy device (e.g., Bluetooth Low Energy (BLE) beacon device or other device) configured to periodically broadcast signals with data associated with screen panel (e.g., panel identification data, sensor data, location information, power level information, etc.).

The monitoring system can further include a controller node. The controller node can be mounted to or otherwise attached to a support system for the screening system (e.g., a steel support frame). The controller node can control operation of the panel node(s) associated with the screen panels in the screening system. The controller node can receive signals communicated wirelessly from the panel nodes (e.g., either direct or via one or more relay nodes (e.g., controller nodes acting as relay nodes)). The controller node can communicate with one or more remote devices (e.g., user devices, remote computing devices, servers, a cloud computing system, etc.) using one or more wired and/or wireless communication links. In this way, the controller node can act as a gateway for the panel nodes to communicate with remote devices.

The controller node can obtain and/or store information received from each of the panel nodes. For instance, the controller node can obtain and/or store information associated with panel location, wear level, power level information, etc. The controller node can obtain information from the panel nodes via direct wireless communications and/or via one or more relay nodes. The controller node can include and/or be coupled to one or more sensors configured to obtain data associated with the screening system, such as motion sensor(s) (e.g., accelerometers, gyroscopes, etc.), environmental sensors (e.g., temperature sensor(s), etc.).

The controller node can interface with the panel nodes and instruct the panel nodes to enter into different modes of operation (e.g., beacon mode, server mode, signal strength measuring mode, etc.). For example, the controller can interface with the panel nodes to put the panel nodes in a signal strength measuring mode. In a signal strength measuring mode, the controller node can control the panel node to operate its communication circuit in a receive mode. The communications circuit can obtain signal strength data (e.g., receive signal strength indicator (RSSI) or other metrics) when in the receive mode. The signal strength data can be processed (e.g., by the panel node, the controller node, and/or one or more remote devices) to determine location data for the screen panel associated with the panel node.

The controller node can be in communication with one or more remote devices via a wireless and/or wired communication interface. For instance, the controller node can be in wireless communication with a network access point (e.g., WiFi network access point) to access a network (e.g., local area network, wide area network, Internet, cellular network, etc.). The controller node can communicate information to a remote device, such as a cloud computing system over the network. A user or operator can access the cloud computing system via any suitable computing device (e.g., smartphone, tablet, wearable device, laptop, desktop, special purpose device). In addition, and/or in the alternative, a user or operator can directly interface with the controller node with a computing device (e.g., smartphone, tablet, wearable device, laptop, desktop, special purpose device) located proximate to the controller node and in direct communication (e.g., via a direct wireless communication link) with the controller node.

A user can use the computing device to view information, request services, and control aspects of the monitoring system and/or screening system. The computing device can provide for display a user interface (e.g., graphical user interface, audio user interface such as a voice responsive digital assistant, etc.) as part of an application (e.g., a browser or special purpose application) executed on the computing device to allow a user to interface with the monitoring system. The user can interact with the user interface to obtain information associated with the wear level for each screen panel, locate and/or identify screen panels, display information about screen panel life cycle history, receive notification(s), etc.

The monitoring systems and methods according to example aspects of the present disclosure can be used to implement a number of use cases associated with a screening system. For instance, the monitoring system can be used to implement maintenance support activities. The maintenance support activities can include, for instance, providing report(s)/notification(s) per screen panel regarding how long a screen panel has been in use and the wear level of the screen panel. The report(s)/notification(s) can include a projection of when the screen panel will need to be replaced. The report(s) can be presented on or provided by a user interface associated with a computing device interfaced with the monitoring system. The notification(s) can be pushed to the user in numerous ways, such as by email, social media, text message, vibratory alert, optical alert, audible alert (e.g., via a voice responsive digital assistant), etc.

The maintenance support activities can include recording a verification that a correct screen panel is installed and/or located properly in a screening system. A notification can be provided to a user in case of a mismatch between screen panel and screening system. The system can provide updated data sheets (or other reports) associated with the screen panels as installed on the screening system (e.g., via a user interface). The system can allow a user to modify the data sheet (or other reports) associated with the screen panels as installed on the screening system (e.g., via the user interface). A notification can be provided to a supplier of the screen panel when a technician installs a screen panel type other than installed previously on the screening system and/or as recorded in a data sheet (or other report).

The monitoring system can be used to implement screen panel analysis. For instance, the system can obtain measurements associated with the screen panel (such as temperature, vibration in multiple directions, panel wear, remaining panel thickness, power level status for panel nodes, etc.). The information can be analyzed, for instance, to determine panel load (e.g., based on the vibration or other motion measurements). The information can be analyzed, for instance, to project remaining life of the panel (e.g., based on panel wear, time installed, vibration, etc.). In some embodiments, the monitoring system can display information associated with panel life (e.g., projected remaining life) can be displayed in a user interface or report as a function of location of the screen panel in the screening system. In some embodiments, the data obtained by the screen panels can be used to update models used to predict screen panel characteristics (e.g., remaining life) using a machine learning or other suitable model generation algorithm.

The monitoring system can be used to implement prevention activities associated with the screening system. For instance, data obtained by the monitoring system (e.g., sensing element data) can be analyzed to determine trigger events (e.g., asymmetric vibration, broken spring, overload, out of spec temperature, etc.). The system can provide notification(s) of such trigger events or otherwise when maintenance (e.g., preventative maintenance) is needed.

The monitoring system can be used to implement logistics support activities. For instance, the system can maintain records (e.g., in one or more databases associated with a cloud computing environment) associated with all screen panels in an inventory by panel number and/or receive date/shipping date. The system can identify oldest screen panels in inventory to be used as next in line when replacing screen panels in a screening system. The system can provide reports to technicians regarding panel inventory and automatically order new screen panels for inventory when panel inventory is low or projected to fall below a threshold level. The system can provide reports associated with installed screen panels by screening system, panel identification data (e.g., serial number), installation date, manufacturing date, and/or processed material tonnage.

The monitoring system can be used to implement activities associated with a screen panel supplier. For instance, the monitoring system can provide notification(s) when screen panels are received in an inventory and/or when the screen panels are installed in a screening panel. The monitoring system can automatically order new screen panels based on inventory and/or projected replacement dates for screen panels. A database associated with, for instance, a cloud computing system can maintain records associated with the screen panels. The records can include information such as panel identification, manufacturing date, inspection date(s), ship date(s), receiving date(s), installation date(s) as well as data obtained by panel nodes.

FIG. 1 depicts an example screening system 100. As illustrated, screening system 100 includes a support frame 110 that includes a plurality of support members 120 mounted in parallel relationship to one another. Support frame 110 supports screen panels 150 which are used to separate and size material. Support frame 110 may be composed of steel or other material capable of supporting screen panels 150.

Figure 2:
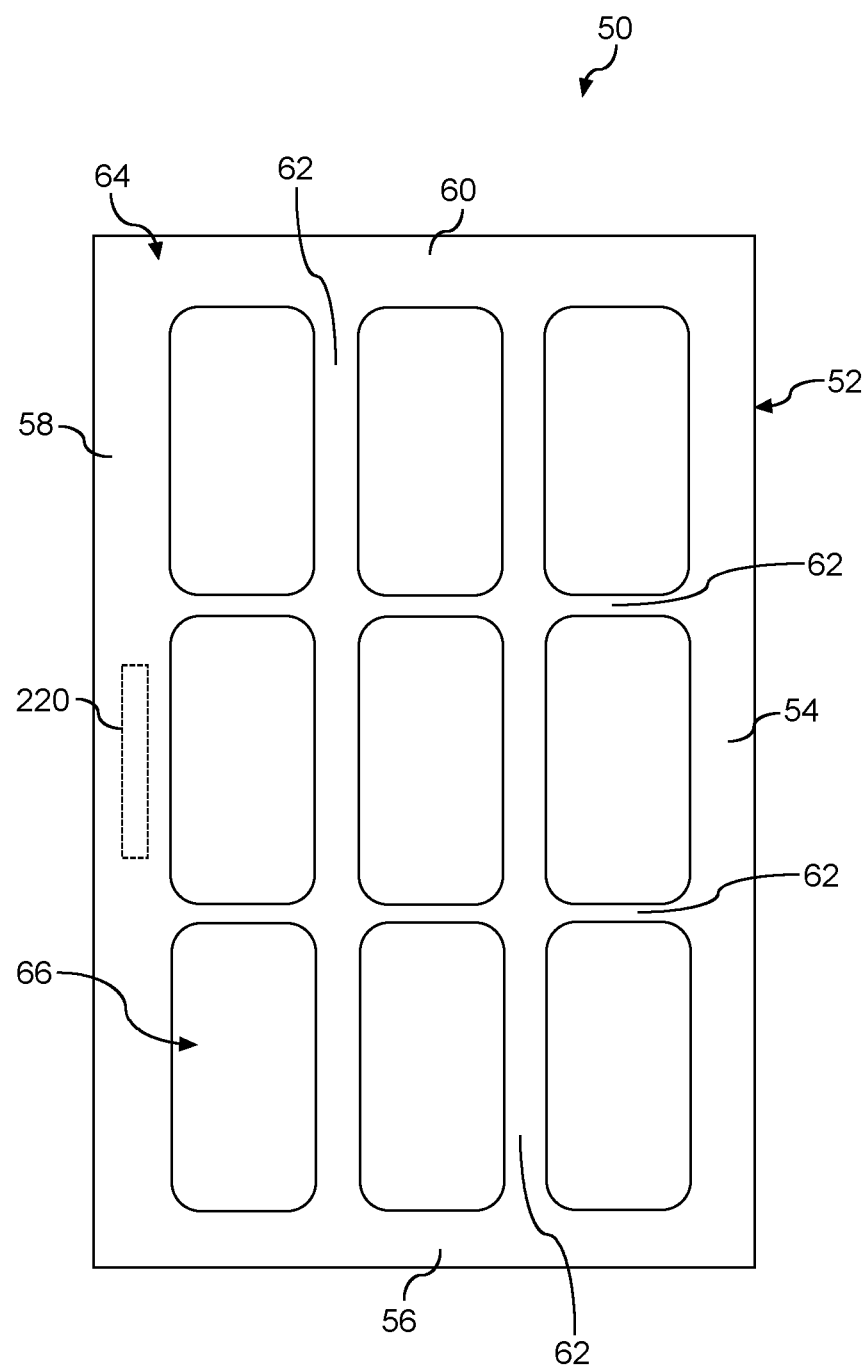
FIG. 2 depicts a plan view of an example screen panel.

FIG. 2 depicts a plan view of an example modular screen panel 50 that can be used as part of screening system 100 (FIG. 1). As illustrated, screen panel 50 generally includes a square or rectangular panel that includes a peripheral edge portion 52 having an upper surface, a lower surface, and an outer peripheral surface interconnecting the upper and lower surfaces. The peripheral edge portion 52 has a pair of mutually laterally spaced side members 54 and 58 and a pair of mutually axially spaced end members 56 and 60. A plurality of spaced ribs 62 extend across the panel 50 to define a screening surface 64. The ribs 62 define a plurality of apertures 66 in the screening surface 64. As will be discussed in more detail below, the screen panel 50 can include a panel node 220 that can be used in accordance with example embodiments of the present disclosure.

The screen panels 150 depicted in FIG. 1 are screen panels with square apertures 152, while screen panel 50 illustrated in FIG. 2 is a screen panel with rectangular apertures 66. Screen panels are available in a variety of different types of materials and can include apertures having a variety of different types and sizes. For example, certain screen panels can be formed from a resilient material such as polyurethane. Other screen panels can include steel. Screen panels can have square apertures, zig-zag apertures, ribbed apertures, elongated apertures, no apertures, or other apertures of varying width and length. The type of screening media or screen panels used in a particular screening arrangement can vary depending on the type of materials being screened and various other factors. Those of ordinary skill in the art, using the disclosures provided herein, will understand that a variety of different screening media and screen panels can be used without deviating from the scope of the present invention.

Referring to FIG. 1, a securing element 140 is used to secure screen panels 150 to support frame 110. Securing element 140 can include a sleeve adapted to receive a protrusion formed in the screen panels 150. However, the present disclosure is not limited to this example securing device. For example, in another embodiment, securing element 140 can also include a protrusion adapted to engage an indentation formed in the screen panels 150. A variety of securing elements for securing screening media to a support frame are known. Using the teachings disclosed herein, those of ordinary skill in the art will recognize that any type of securing element can be used without deviating from the scope and spirit of the present invention. For example, the securing element can include rails, pins, snaps, or other securing elements.

Support members 120 can include a plurality of openings or sockets 160 for receiving the securing elements 140. The sockets 160 may be spaced at regular intervals or at irregular intervals along the length of the support members 120. A securing element 140 can be secured within a socket 160 in a variety of ways. For example, a securing element 140 can be secured to support member 120 by a screw thread. In other embodiments, securing element 140 can be snapped into support member 120.

Screening arrangement 100 can optionally include a plurality of protective covers 130 mounted in side-by-side relationship along the length of support members 120. Protective covers 130 can be used to protect support members 120 from abrasion during the screening process. The protective covers 130 can be formed from a variety of resilient materials that are resistant to abrasion, such as a high wear resistant polymer, such as polyurethane.

During a typical screening process, abrasive materials are passed along the screening surface of screen panels 150. Apertures 152 in screen panels 150 allow desired material to pass through screen panels 150 as the materials are passed along the screening surface of screen panels 150. The abrasive properties of these materials can lead to wear in the screening surface of screen panels 150. When the screening surface of a screen panel 150 has worn to a threshold level, the apertures 152 begin to allow particles to break through the screen panel 150, leading to contamination of the screened material. When a screen panel 150 has achieved a threshold level of wear, the screen panel 150 can be disengaged from the support frame 110 and replaced with a new or different screen panel 150.

Figure 3:
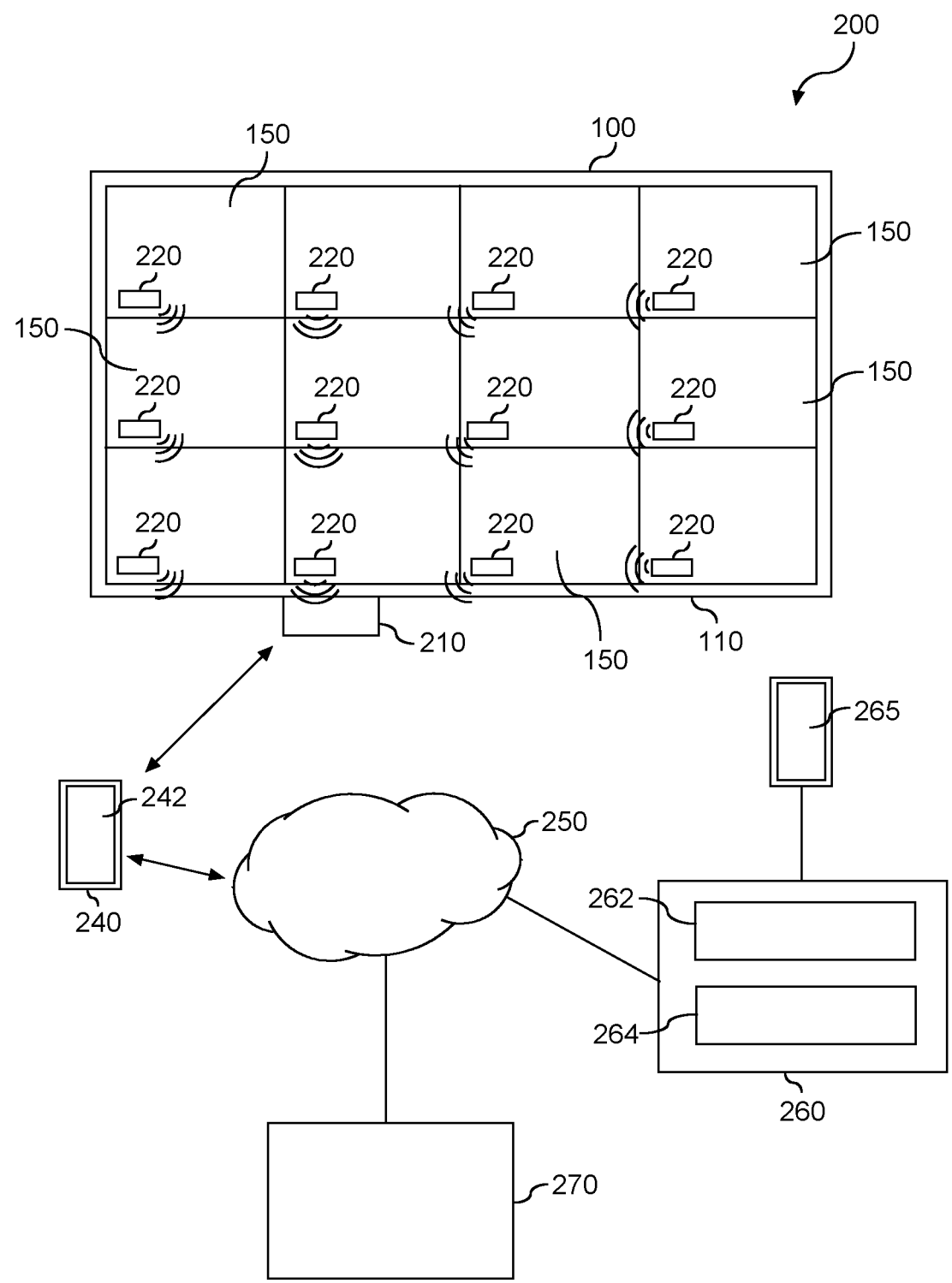
FIG. 3 depicts a schematic diagram of example components of a screening system according to example embodiments of the present disclosure.

FIG. 3 depicts a schematic diagram of an example monitoring system 200 for a screening system 100 (e.g., screening system 100 of FIG. 1) according to example embodiments of the present disclosure. The monitoring system 200 includes a panel node 220 associated with each of a plurality of screen panels 150 mounted to the screening system 100 (representative screen panels 150 are labeled in FIG. 3). The monitoring system 200 includes a controller node 210 mounted to a support frame 110 or other component of the screening system 100.

The panel node 220 can obtain data from one or more sensing elements and provide the data to the controller node 210. The controller node 210 can obtain the data from the panel nodes 220 and/or can be configured to control operation of the panel nodes 220.

Each panel node 220 can be configured to be in wireless communication with the controller node 210. For instance, the panel node 220 can include a communication interface (e.g., a beacon device) that provides signals over a wireless communication protocol, such as Bluetooth Low Energy protocol.

The controller node 210 can communicate with the panel nodes 220 as well as additional remote devices. In this way, the controller node 210 can act as a gateway or access point for the panel nodes 220.

For instance, the controller node 210 can be in direct communication with a user device 240 using a direct communication link (e.g., wireless communication link). The user device 240 can be, for instance, a smartphone, tablet, wearable device, laptop, desktop, special purpose device, display with one or more processors or other device. The user device 240 can include a display 242 or other interface (e.g., audio interface) to allow a user to interact with the system 200 via an application executed on the user device 240. For instance, a user can obtain data, receive notifications, and/or control aspects of the monitoring system via the user device 240.

The controller node 210 can be in communication with a cloud computing system 260 over a network 250. The network 250 can include any combination of devices and wired and/or wireless communication links. The network 250 can be a local area network (e.g., WiFi network), wide area network (e.g. the Internet), mesh network (e.g., among different controller nodes for different screening systems), cellular network, or combinations of any of the foregoing. Communications over the network can be carried out over any suitable protocol and/or technology. In some embodiments, the controller node 210 can access the network using a communication protocol that is different from the communication protocol associated with wirelessly communicating with the panel nodes 220. For instance, the communication protocol can be an IEEE 802.11 protocol (e.g., WiFi protocol).

Other communication technologies/protocols can be used to communicate between the panel nodes 220 and the controller node 210 and/or to communicate between the controller node 210 and various remote devices without deviating from the scope of the present disclosure. Example communication technologies can include, for instance, Bluetooth Low Energy, Bluetooth mesh networking, near-field communication (NFC), RFID, Wi-Fi (e.g., IEEE, 802.11), Wi-Fi Direct (for peer-to-peer communication), Z-Wave, Zigbee, HaLow, cellular communication, LTE, low-power wide area networking low-power wide area networking (Sigfox, Lora, Ingenu), VSAT, Ethernet, MoCA (Multimedia over Coax Alliance), PLC (Power-line communication), DLT (digital line transmission), etc. Other suitable wired and/or wireless communication protocols can be used that are currently developed and/or are developed in the future without deviating from the scope of the present disclosure.

The cloud computing system 260 can include one or more processors 262 and one or more memory devices 264. The cloud computing system 260 can be a distributed computing system that is located in multiple different locations. The one or more memory devices 264 can maintain and store data (e.g., in one or more databases) associated with screening system as obtained by one or more of the panel nodes 220, the controller nodes 210, user input, or other data source(s).

A user or operator can access the cloud computing system 260 (e.g., data stored in the memory devices 264) via a direct connection or over network 250. For instance, a computing device 265 having one or more user interfaces (e.g., display, audio interface, etc.) can be directly connected to the cloud computing system 260. As another example, a computing device 270 (e.g., a user device such as a smartphone, tablet, laptop, desktop, special purpose device, wearable device, etc.) can access the cloud computing system over network 250.

Figure 4:
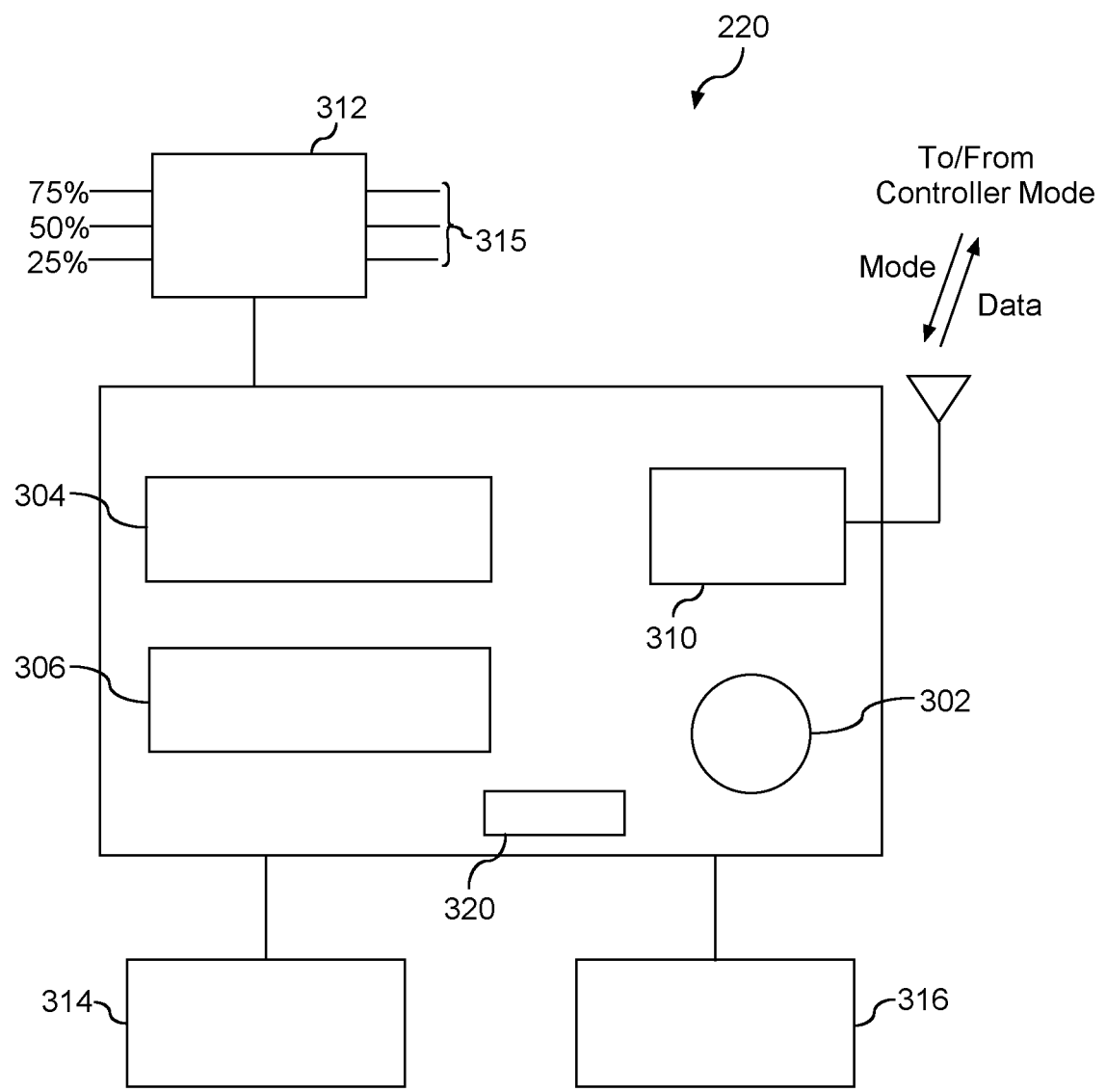
FIG. 4 depicts a schematic diagram of an example panel node according to example embodiments of the present disclosure.

FIG. 4 depicts a schematic diagram of an example panel node 220 according to example embodiments of the present disclosure. The panel node 220 can include a power source 302. The power source 302 can be, for instance, a battery power source. For instance, the power source 302 can be a coin cell battery. However, other suitable power sources can be used as power source 302 without deviating from the scope of the present disclosure. For instance, a piezoelectric power source can be used to harvest energy from vibrations of the screen panel. A solar power source can be used to harvest solar energy.

The panel node 220 can include a communication circuit 310 configured to wirelessly communicate data. In some embodiments, the communication circuit 310 can be a beacon device, such as a Bluetooth Low Energy beacon device. The communication circuit 310 can include a transceiver, antenna, and other circuitry configured to communicate information over a wireless medium.

The panel node can include one or more processors 304 and one or more memory devices 306. The memory devices 306 can be configured to store data (e.g., data obtained by the panel node) and computer-readable instructions. The one or more processors 304 can execute computer-readable instructions stored in the one or more memory devices 306 to cause the processors 304 to perform operations.

In some embodiments, the communication circuit 310, one or more processors 304, and one or more memory devices 306 can be a part of the same chip or other electronic component. For instance, the panel node 220 can include a NRF51 or nRF52 chip manufactured by Nordic Semiconductor.

The panel node 220 can include one or more sensing elements 312 (e.g., wear sensors) configured to monitor wear of a screen panel. In some embodiments, the sensing element(s) 312 can include one or more conductors 315 embedded at different depths in the screen panel (e.g., 75% depth, 50% depth, 25% depth). When the screen panel has worn to a certain level, the conductor will break, providing a signal 312 from the sensing element(s) 312 that the screening panel has worn to a certain level (e.g., 75%, 50%, 25%).

The panel node 220 can include other sensors configured to monitor characteristics of the screen panel, such as a panel becoming loose or dislodged. For instance, the panel node 220 can include one or more motion sensor(s) 314. The motion sensor(s) 314 can provide signals associated with acceleration, vibration, etc. The motion sensor(s) 314 can include, for instance, one or more accelerometers, one or more gyroscopes, one or more vibration sensors (e.g., piezoelectric vibration sensors), etc.

In some embodiments, the panel node 220 can include one or more environmental sensor(s) 316. The environmental sensor(s) 316 can provide signals indicative of environmental conditions associated with the screen panel (e.g., temperature, pressure, humidity, sun exposure time, etc.). Example environmental sensor(s) 316 can include temperature sensors, pressure sensors, humidity sensors, solar sensors, wind sensors, etc.

The panel node 220 can include an indicator 320. The indicator 320 can be configured to provide optical and or audio indicators associated with the panel node 220. The indicator 320 can be indicative of low battery, reaching a threshold level of wear (e.g., less than 25%), high temperature conditions, or other event. The indicator 320 can include optical indicators, such as LEDs that are illuminated upon the occurrence of various events. In some embodiments, the LEDs can be in optical communication with an optical conductor that transmits the optical signal from the LED to a side of the screen panel where it can be visible to a user. The indicator 320 can include an audio indicator configured to provide an audio indicator upon the occurrence of various events.

The communication circuit 310 can transmit data obtained by the various sensors (e.g., sensing element(s) 312, motion sensor(s) 314, environmental sensors 316) to the controller node 220. The communication circuit 310 can receive communication from the controller node 210 or other panel nodes 220. For instance, the controller node 210 can send communications (e.g., panel node signals) to control the panel node 220 to enter into one of a plurality of different modes of operation.

One example mode of operation for a panel node 220 is the default beacon mode. In the default beacon mode, the communication circuit 310 (e.g., beacon device) periodically sends a signal with data (e.g., sensor data) to the controller node 210. For instance, the communication circuit 310 can send a signal with data every 5 seconds or at other irregular or irregular intervals. The signal from the communication circuit 310 can include data such as panel ID, wear status, temperature, and power level status. In some embodiments, after transmission of a signal, the communication circuit 310 can be configured to activate a receive mode to receive any commands from the controller node 210 (e.g., a command to enter into a server mode).

The frequency of communication of data from the panel node 220 to the controller node 210 can be selected to increase battery life of the power source for the panel node 220. For instance, the communication circuit 310 send a signal with data every 5 seconds. In some embodiments, the frequency at which the communication circuit 310 communicates with the controller node 220 can be dependent on data obtained from the various sensors (e.g., sensing element(s) 312, motion sensor(s) 314, environmental sensors 316). For instance, the communication circuit 310 can communicate with less frequency when the screen panel has not yet worn to a certain threshold level (e.g., above 75%). The communication circuit 310 can communicate more frequently when the screen panel has a worn to a certain threshold level.

Another example mode of operation for a panel node 220 can be a server mode. When in the server mode, the panel node can be connected to the controller node 210 and can act as a server. For instance, when in the server mode, the panel node 220 can expose an interface to the controller node 210 to allow the controller node to control aspects of the panel node 220. In this way, the controller node 210 can read and/or write data to the panel node 220. In addition, the panel node can be operated in one or more sub modes, such as a data read mode, a signal strength measuring mode, identification mode, etc.

In the data read sub mode, the panel node 220 can expose a data read interface to the controller node 210. The controller node 210 can read all parameters that are normally communicated to the controller node 210 via a wireless communication signal. In some embodiments, the controller node 210 can read signal strength measurements (e.g., RSSI measurements) by the panel node 220 (e.g., for location identification) as well as any additional parameters (e.g., serial number, item number, panel type, opening size, etc.).

In the signal strength measuring sub mode, the controller node 210 can request the panel node 220 to obtain signal strength measurements (e.g., RSSI measurements or other signal strength measurements). In this case, the communication circuit 310 of the panel node can send a wireless signal (e.g., beacon signal). The communication circuit 310 can activate a receive mode and record all signals (e.g., wireless signals from other panel nodes 220) received during a time period (e.g., about 1 minute). The signal strength measurements can be recorded in memory 306 and later ready by the controller node 220 for location identification purposes. Other data can be used for location identification purposes, such as time of flight information.

In an identification sub mode, the controller node 210 can request the panel node 220 to identify itself by activating its indicator 320 (e.g., activating an LED). In some embodiments, the LED can be fed into an optical conductor so that the indicator can be seen from a side of the screen panel by a user.

Figure 5:
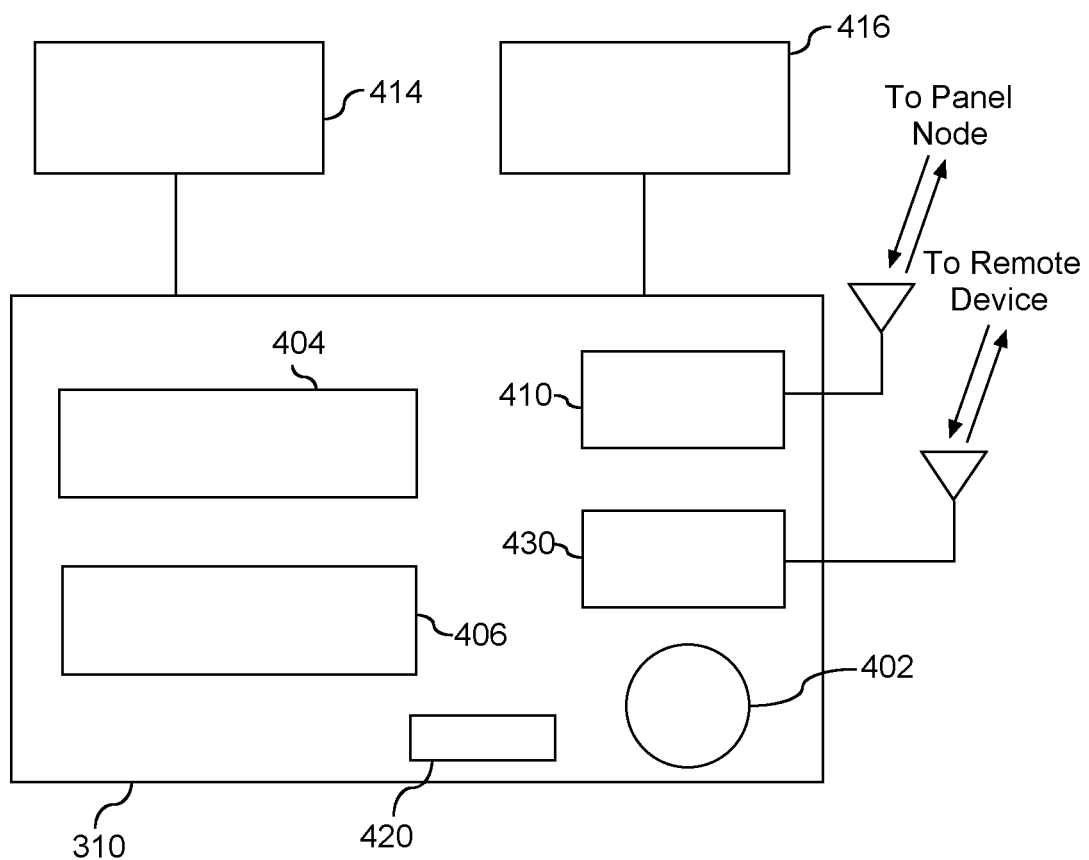
FIG. 5 depicts a schematic diagram of an example controller node according to example embodiments of the present disclosure.

FIG. 5 depicts a schematic of an example controller node 210 according to example embodiments of the present disclosure. The controller node 210 can include a power source 402. The power source 402 can be, for instance, a battery power source. However, other suitable power sources can be used as power source 402 without deviating from the scope of the present disclosure. For instance, a piezoelectric power source can be used to harvest energy from vibrations of the screen panel. A solar power source can be used to harvest solar energy. In some embodiments, the power source 402 can be a magnetic energy harvester.

The controller node 210 can include a first communication circuit 410 configured to wirelessly communicate data. In some embodiments, the communication circuit 410 can be configured to communication information with the panel node 220 using a first protocol (e.g., Bluetooth Low Energy). The communication circuit 410 can include, for instance, a transceiver, a receiver and transmitter, antenna(s), and/or other circuitry configured to communicate information over a wireless medium.

The controller node 210 can include a second communication circuit 430 configured to communicate data (e.g., over a wired and/or wireless communication medium). The controller node 210 can be configured to communicate data to remote devices as described with reference to FIG. 3 using the second communication circuit 430. The second communication circuit 430 can be configured to communicate information using a second protocol (e.g., an IEEE 802.11 protocol) that is different from the first protocol. The communication circuit 430 can include, for instance, a transceiver, a receiver and a transmitter, antenna(s), and/or other circuitry configured to communicate information over a wireless medium.

The controller node 210 can include one or more processors 404 and one or more memory devices 406. The memory devices 406 can be configured to store data (e.g., data obtained by the controller node 210) and computer-readable instructions. The one or more processors 404 can execute computer-readable instructions stored in the one or more memory devices 406 to cause the processors 404 to perform operations, such as any of the operations associated with the controller node 210 disclosed herein.

The controller node 210 can include and/or be in communication with one or more sensors configured to monitor characteristics of the screening system. For instance, the controller node 210 can include one or more motion sensor(s) 414. The motion sensor(s) 414 can provide signals associated with acceleration, vibration, etc. The motion sensor(s) 414 can include, for instance, one or more accelerometers, one or more gyroscopes, one or more vibration sensors (e.g., piezoelectric vibration sensors), etc.

In some embodiments, the controller node 210 can include and/or be in communication with one or more environmental sensor(s) 416. The environmental sensor(s) 416 can provide signals indicative of environmental conditions associated with the screen panel (e.g., temperature, pressure, humidity, sun exposure time, etc.). Example environmental sensor(s) 416 can include temperature sensors, pressure sensors, humidity sensors, solar sensors, wind sensors, etc.

The controller node 210 can include an indicator 420. The indicator 420 can be configured to provide optical and or audio indicators associated with the controller node 210. The indicator 420 can be indicative of low battery, error, connectivity status, or other event. The indicator 420 can include optical indicators, such as LEDs that are illuminated upon the occurrence of various events. The indicator 420 can include an audio indicator configured to provide an audio indicator upon the occurrence of various events.

The communication circuit 410 can transmit and receive data from the panel nodes 220. For instance, the communication circuit 410 can receive communication from the controller panel nodes. For instance, the communication circuit 410 can send communications to control panel nodes 220 to enter into one of a plurality of different modes of operation. The communication circuit 430 can communicate information with remote devices using direct communications or over a network.

Figure 6:
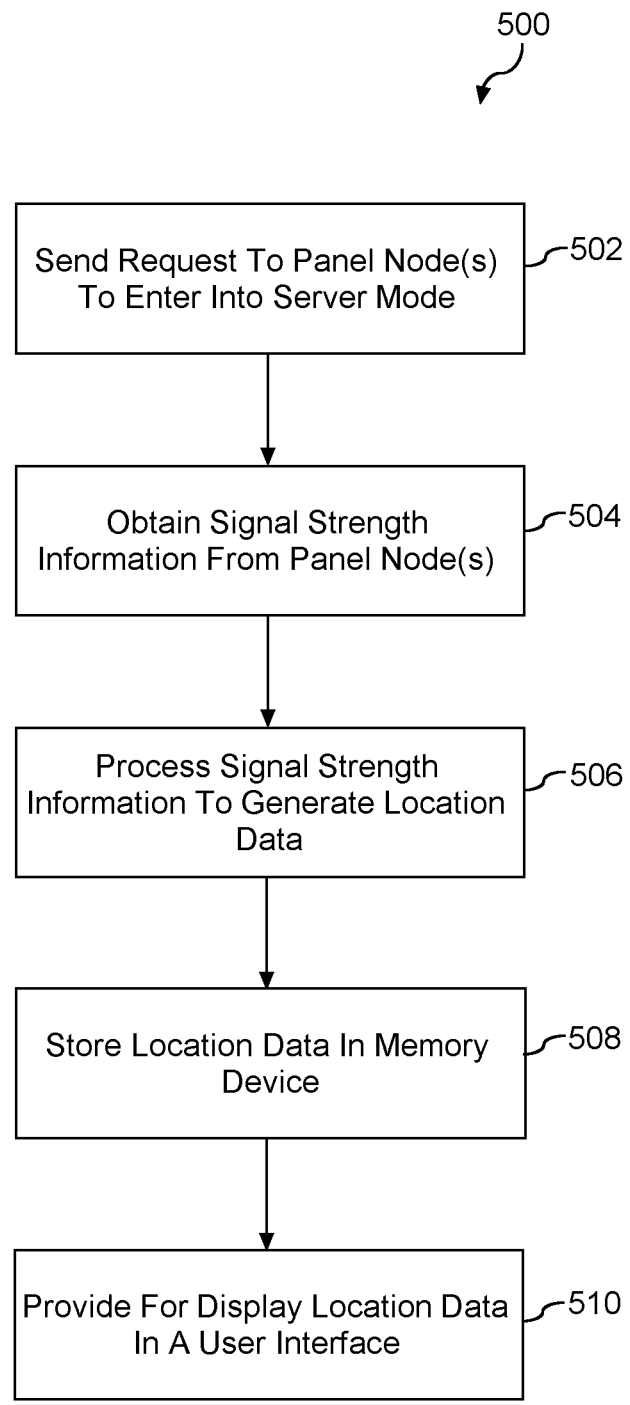
FIG. 6 depicts a flow diagram of an example method according to example embodiments of the present disclosure.

FIG. 6 depicts a flow diagram of an example method (500) that can be implemented using a monitoring system according to example embodiments of the present disclosure. The method (500) can be implemented upon installation of the screening system to facilitate setup for monitoring characteristics of the screening system or at various other regular or irregular intervals. The method (500) can be implemented upon the occurrence of various trigger events. The method (500) can be implemented, for instance, using the example monitoring system 200 described in FIGS. 3-5. FIG. 6 depicts steps performed in a particular order for purposes of illustration and discussion. Those of ordinary skill in the art, using the disclosures provided herein, will understand that the various steps of any of the methods described herein can be adapted, modified, performed simultaneously, omitted, rearranged, include steps not illustrated, and/or expanded in various ways without deviating from the scope of the present disclosure.

At (502), the method includes sending, by the controller node, a request that the panel nodes enter a server mode. For instance, the controller node 210 can send a command to each panel node 220 in the screening system to enter the server mode.

At (504), the method can include obtaining, by the controller node, signal strength information from the panel nodes. The signal strength information can include signal strength measurements (e.g., RSSI measurements) obtained from each of the panel nodes when operating in a signal strength measuring sub mode. The signal strength information obtained from a panel node can include, for instance, signal strength of signals received from nearby panel nodes and signal strength received from the controller node.

At (506), the method includes processing, by the controller node or other computing device, the signal strength measurements received from each of the panel nodes to generate location data for the panel nodes. The location data can include data indicative of the location of a panel node (and its corresponding screen panel) in the screening system once installed. In some embodiments, the location data can include a geographical model of the screen panel including a map of the location of each screen panel in the screening system.

In some embodiments, the signal strength data can be processed using known transmission power to determine a distance of panel nodes relative to other panel nodes in the system as well as to the controller node. For instance, models/algorithms correlating transmission power with distance and receive signal strength can be used to derive distance. The information can be aggregated across all panel nodes to generate the location data for the panel nodes in the screening system. The signal strength data can be processed locally at the controller node and/or communicated to one or more remote devices for processing to determine the location data for the panel nodes in the screening system.

At (508), the method can include storing the location data in a memory device. For instance, the location data can be stored at a local memory associated with the controller node and/or at memory device(s) associated with a remote device(s) (e.g., a cloud computing system).

At (510), the method can include providing, by the controller node, the location data for display in a user interface. For instance, the controller node can communicate information to a remote device (e.g., in response to a request from the remote device) for display in a graphical user interface presented as part of an application (e.g., browser or stand alone application) executed on the remote device. The controller node can communicate directly with a remote device and/or with remote devices over a network (e.g., via a cloud computing system) as described with reference to FIG. 3. An example graphical user interface will be discussed with reference to FIGS. 8 and 9.

Figure 7:
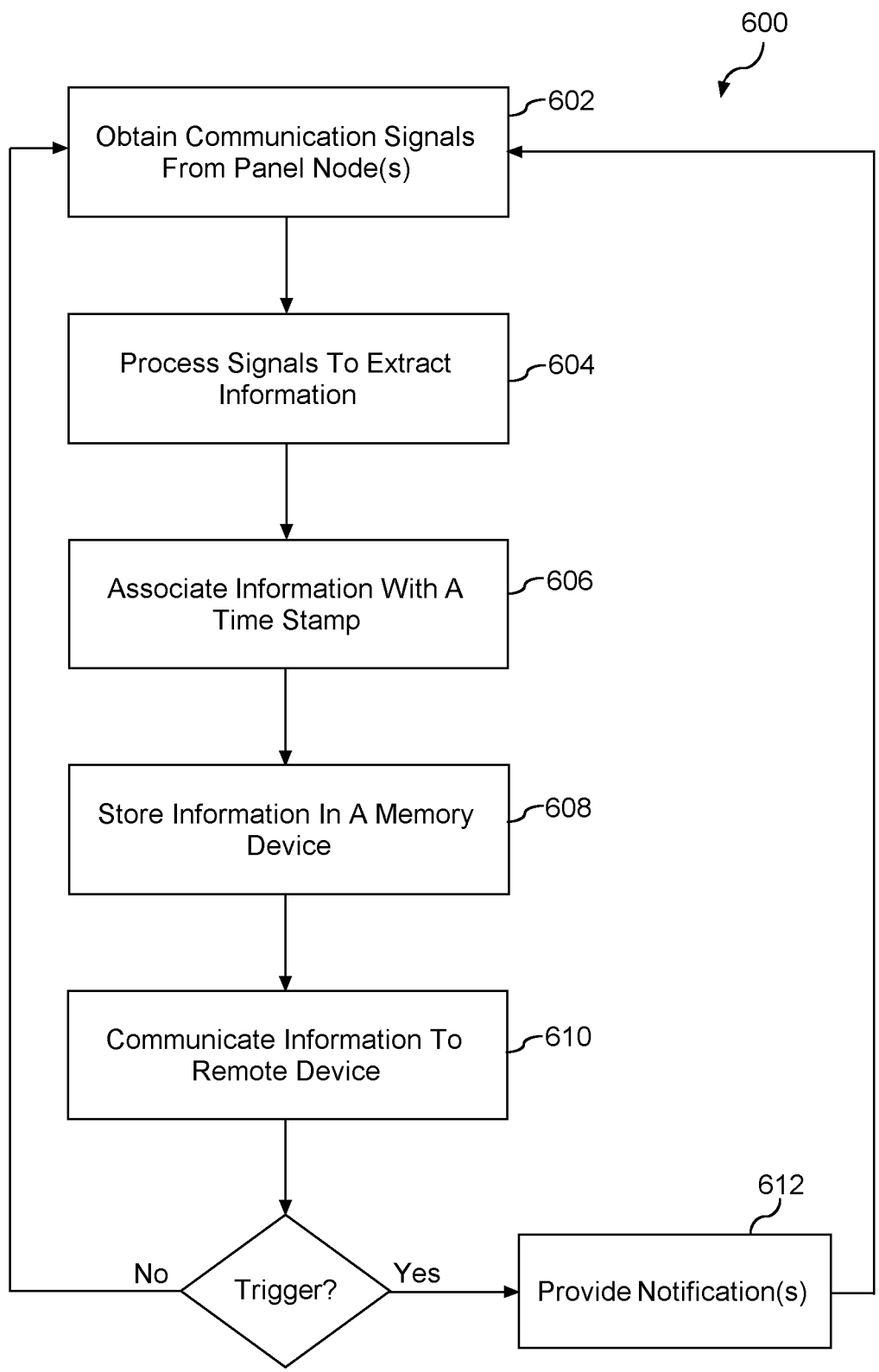
FIG. 7 depicts a flow diagram of an example method according to example embodiments of the present disclosure.

FIG. 7 depicts a flow diagram of an example method (600) according to example embodiments of the present disclosure. The method can be implemented, for instance, using the example monitoring system 200 described in FIGS. 3-5. FIG. 7 depicts steps performed in a particular order for purposes of illustration and discussion. Those of ordinary skill in the art, using the disclosures provided herein, will understand that the various steps of any of the methods described herein can be adapted, modified, performed simultaneously, omitted, rearranged, include steps not illustrated, and/or expanded in various ways without deviating from the scope of the present disclosure.

At (602), the method includes obtaining, by the controller node, wireless communication signals (e.g., beacon signals) from one or more panel node(s). For instance, the controller node 210 can receive signals transmitted by panel nodes 220 when operating in default beacon mode. The signals can include information such as panel ID, sensor measurements, power level status, etc.

At (604), the method includes processing, by the controller node, the wireless communication signal to extract information from the signal. For instance, the controller node 210 can process signals from the panel nodes to determine information such as panel ID, sensor measurements, power level status, etc.

At (606), the method includes associating, by the controller node, the processed information with a time stamp. For instance, the controller node 210 can associated a time stamp with the information extracted from the signals received from the panel nodes 220. At (608), the information can be stored in a memory device.

At (608), the method can include communication the information to a remote device. For instance, the controller node can communicate information to a remote device (e.g., in response to a request from the remote device) for display in a graphical user interface presented as part of an application (e.g., browser or stand alone application) executed on the remote device. The controller node can communicate directly with a remote device and/or with remote devices over a network (e.g., via a cloud computing system) as described with reference to FIG. 3. An example graphical user interface will be discussed with reference to FIG. 8.

At (610), the method can include identifying, by the controller node, the occurrence of a trigger event. When a trigger event occurs, the method can include providing a notification (612). Otherwise the method can continue to obtain wireless communication data from the panel nodes. Example trigger events can be associated with sensor data (e.g., wear level, temperature, vibration) exceeding a threshold. Another example trigger event can be associated with not receiving a communication from a panel node for a specified time period (e.g., 5 minutes). In some embodiments, the trigger event can be associated with sensor data on the controller node exceeding a threshold.

The notification provided at (612) can be provided in any suitable manner. The notification(s) can be pushed to the user in numerous ways, such as by email, social media, text message, vibratory alert, optical alert, audible alert (e.g., via a voice responsive digital assistant), etc. In some embodiments, the controller node 210 can provide a notification (e.g., optical notification, audible notification) via an indicator 420. The controller node 210 can communicate the notification to a remote device (e.g., see FIG. 3). The remote device can then provide the notification to the user using any suitable user interface (e.g., graphical user interface, audio user interface, alert system, etc.). In some embodiments, the notification can include data associated with the trigger event as well as the associated screen panel. For instance, the notification can identify the screening system, panel, location of the panel, panel type, serial number, time associated with the trigger event, and data associated with the trigger event (e.g., wear level exceeding a threshold, lack of communication, etc.).

Figure 8:
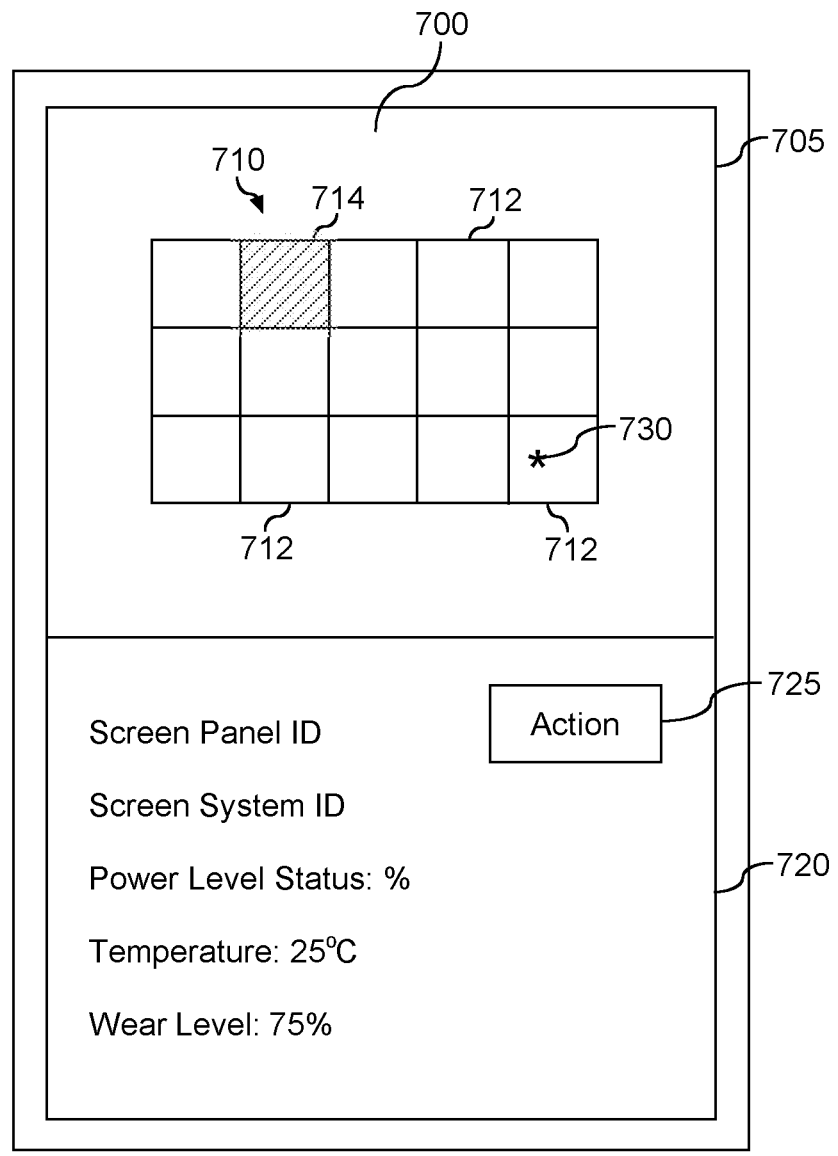
FIGS. 8 and 9 depicts example graphical user interfaces according to example embodiments of the present disclosure.

FIG. 8 depicts an example graphical user interface 700 that can be provided for display on a display device 705 in communication with a controller node according to example embodiments of the present disclosure. As shown, the user interface 700 includes a graphical representation of a screening system 710 as well as individual screen panels 712. As illustrated, the graphical representation 710 of the screening system can indicate the location of individual screen panels in the screening system.

According to example embodiments of the present disclosure, a user can interact with the user interface 700 (e.g., by voice command, clicking, touching, etc.) to select one of the plurality of screen panels 712 as a selected screen panel 714. The selected screen panel 714 can be highlighted to indicate selection of the screen panel as the selected screen panel 714.

In response to selection of the selected screen panel, the user interface 700 can display information associated with the selected screen panel in an information display pane 720. The information can include information obtained from the panel node associated with the selected screen panel 714. For instance, the information can include panel ID, screen ID, power level status of the panel node, temperature, wear level, and other information. Other information can be displayed without deviating from the scope of the present disclosure The user interface 700 can also include one or more "action" tools 725 that will facilitate a user to take action with respect to the screen panel. For instance, a user can order a replacement screen panel by simply interacting with the action tool 725. Other suitable actions occur in response to interaction with an action tool 725. For instance, the user interface 700 can include an action tool that sends a notification to a technician to inspect the screen panel.

As shown in FIG. 8, the user interface 700 can include indicia 730 indicative of an alert or notification associated with a screen panel. The alert or notification can be indicative of, for instance, a panel node not communicating with a controller node, wear level falling below a threshold, or other event.

Figure 9:
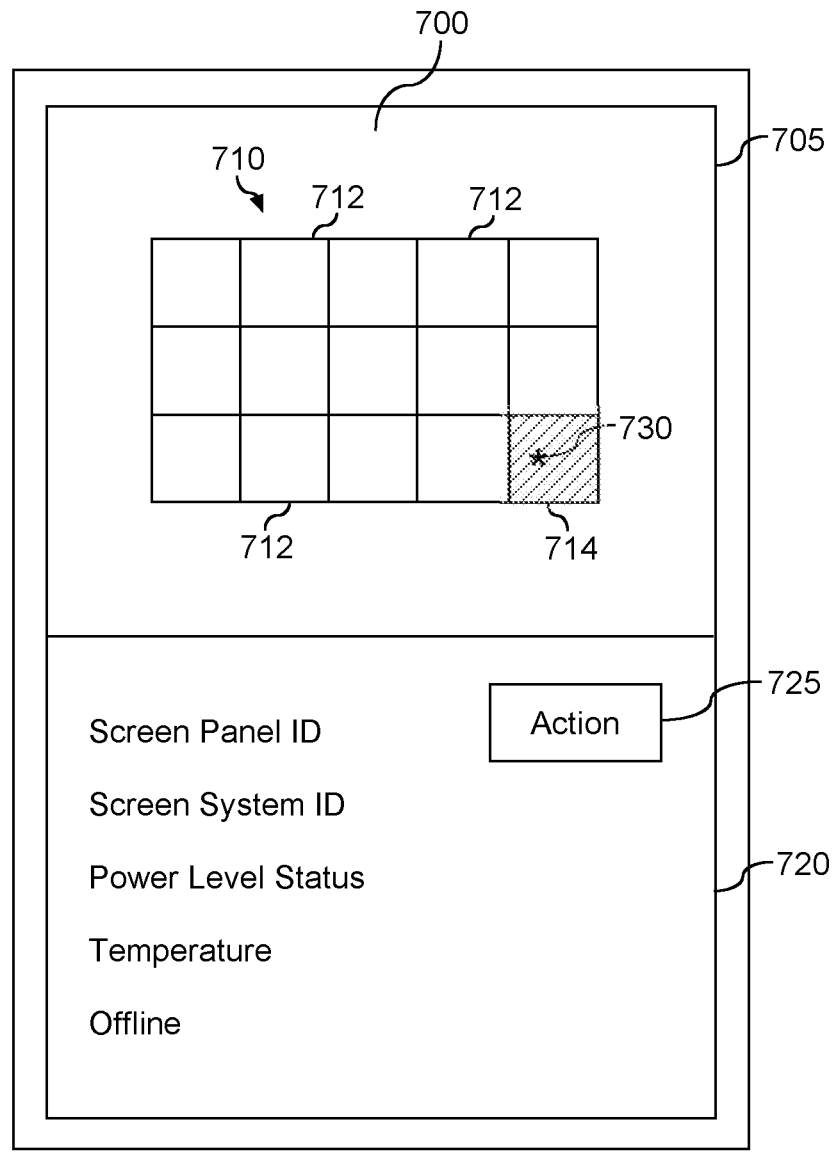

As shown in FIG. 9, a user can interact with the user interface 700 to select the screen panel including the indicia 730 as a selected screen panel 714. In response, the user interface can present information associated with the screen panel 714 in the information display pane 720. The information can indicate that the panel node is "offline"—meaning the panel node is no longer communicating information to a controller node. A user can interact with "action" tool 725 to replace the screen panel, send a technician to inspect the screen panel, and/or take other actions.

FIGS. 8 and 9 depict one example user interaction with a user interface for purposes of illustration and discussion. Those of ordinary skill in the art, using the disclosures provided herein will understand that a variety of different configurations of user interface(s) can be implemented to carry out the functionality of the monitoring system disclosed herein.

For instance, a user interface can be provided for panel replacement support. In one example, the user interface can provide for control node assisted panel replacement support. In this example, the user interface can present a graphical representation of a screening system and screen panels. A technician can mark the panels through the user interface as needing to be replaced. A notification can be provided to install the new panels. A user can install the new panels in the screening system. The technician can interact with the user interface to indicate the installation of the new panels is complete.

In response, the controller node can instruct the new panel nodes associated with the new screen panels to enter into signal strength measuring mode and obtain signal strength data. The controller node can determine the location of the new panels based on the signal strength data. The graphical representation of the screen panels in the screening system can be updated in the user interface. In some embodiments, the technician can manually drag and drop screen panels to proper locations by interacting with the user interface (e.g., through touch or click interactions).

In some embodiments, the monitoring system according to example aspects of the present disclosure can be used to implement unassisted panel replacement. In this example, a technician can replace a screen panel on a screening system with a new panel. The removed screen panel can be brought out of range of wireless communication with the controller node. The controller node can determine that it is receiving signals from a new panel node. In addition, the controller node determines that it is no longer receiving signals from the removed panel node. In response, the controller node can instruct the new panel nodes associated with the new screen panels to enter into signal strength measuring mode and obtain signal strength data. The controller node can determine the location of the new panels based on the signal strength data. The graphical representation of the screen panels in the screening system can be updated in the user interface. A notification can be sent to technicians to verify the location of the new panels.

Figure 10:
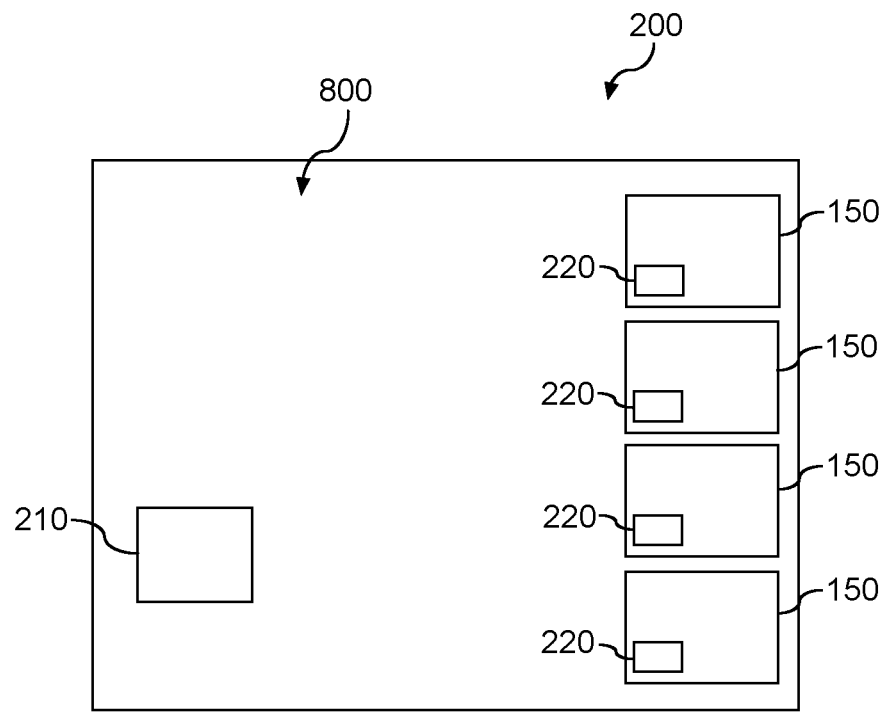
FIG. 10 depicts an example monitoring system for monitoring inventory in a storage space according to example embodiments of the present disclosure.

FIG. 10 depicts a representation of an example monitoring system 200 that can be used for inventory management according to example aspects of the present disclosure. More particularly, an inventory of unused screen panels 150 can be maintained in a space 800. Each of the unused screen panels 150 in inventory can include a panel node 220 according to example aspects of the present disclosure. A controller node 210 can be placed in the space proximate the unused screen panel nodes 150. The controller node 210 and panel node(s) 220 can be configured and can communicate information as discussed in detail with reference to FIGS. 3-5.

In some embodiments, the controller node 210 can receive wireless signals from the panel nodes. When the controller node 210 determines that it has not received a signal from a particular panel node after a period of time, the controller node 210 can determine that the panel has been removed from inventory (e.g., to be placed on a screening system). Once a threshold number of screen panels have been removed from inventory, the controller node 210 can send a notification to order more screen panels and/or can automatically send an order for more screen panels to a screen panel supplier.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A screening system having a plurality of screen panels, each of the screen panels defining a screening surface with one or more apertures configured to separate material, the system comprising:
a plurality of panel nodes, each of the plurality of panel nodes being positioned at or on at least one of the plurality of screen panels, wherein each of the plurality of panel nodes comprises an optical or acoustic indicator; and
a controller node associated with the screening system, the controller node operable to wirelessly communicate with the plurality of panel nodes;
wherein each of the plurality of panel nodes comprises one or more sensing elements and a communication circuit configured to wirelessly communicate information to the controller node.

2. The screening system of claim 1, wherein the controller node is operable to be in wireless communication with a remote device.

3. The screening system of claim 2, wherein the controller node is operable to wirelessly communicate with the plurality of panel nodes using a first wireless communication protocol, the controller node is operable to communicate with the remote device using a second wireless communication protocol, the first wireless communication protocol being different from the second communication protocol.

4. The screening system of claim 1, wherein the one or more sensing elements comprise a wear sensor configured to provide a signal indicative of a level of wear of the screen panel.

5. The screening system of claim 4, wherein the wear sensor comprises one or more conductors embedded in the screen panel.

6. The screening system of claim 1, wherein the one or more sensing elements comprise one or more environmental sensors.

7. The screening system of claim 1, wherein the communication circuit comprises a Bluetooth Low Energy device.

8. The screening system of claim 1, wherein each of the plurality of panel nodes communicates a panel node signal that comprises panel identification data for the screen panel.

9. The screening system of claim 8, wherein the panel node signal comprises data associated with the one or more sensing elements.

10. The screening system of claim 9, wherein the data associated with the one or more sensing elements comprises data indicative of a level of wear for the screen panel.

11. The screening system of claim 1, wherein each of the plurality of panel nodes communicates a panel node signal that comprises location information associated with the screen panel.

12. The screening system of claim 11, wherein the location information is determined based at least in part on signal strength information, wherein the signal strength information comprises received signal strength indicators (RSSI).

13. The screening system of claim 12, wherein the signal strength information is determined based at least in part on signals received at the controller node.

14. The screening system of claim 1, wherein the controller node is configured to control each of the plurality of panel nodes to selectively activate the optical or acoustic indicator.

15. The screening system of claim 1, wherein each of the plurality of panel nodes is configured to activate the optical or acoustic indicator based at least in part on signals received from the one or more sensing elements.

16. The screening system of claim 1, wherein controller node is mounted to a steel support frame of the screening system.

17. A method for monitoring a screening system having a plurality of screen panels, each of the screen panels defining a screening surface with one or more apertures configured to separate material, the method comprising:
obtaining wireless communication signals from a plurality of panel nodes, each of the plurality of panel nodes positioned at or on one of the plurality of screen panels, wherein each of the plurality of panel nodes comprises an optical or acoustic indicator;
processing the wireless communication signals to extract information associated with at least one of the plurality of screen panels; and
providing information associated with the at least one of the plurality of screen panels to a remote device.

18. The method of claim 17, wherein the method is implemented using a controller node associated with a screening system.

19. The screening system of claim 1, wherein the optical or acoustic indicator of each of the plurality of panel nodes comprises:
a light source for generating an optical signal; and
an optical conductor that transmits the optical signal to a side of the screen panel.

20. A screening system having a plurality of screen panels, each of the screen panels defining a screening surface with one or more apertures configured to separate material, the system comprising:
a plurality of panel nodes, each of the plurality of panel nodes being associated with at least one of the plurality of screen panels, wherein each of the plurality of panel nodes comprises an optical indicator, wherein the optical indicator of each of the plurality of panel nodes comprises a light source for generating an optical signal and an optical conductor that transmits the optical signal to a side of the screen panel; and
a controller node associated with the screening system, the controller node operable to wirelessly communicate with the plurality of panel nodes;
wherein each of the plurality of panel nodes comprises one or more sensing elements and a communication circuit configured to wirelessly communicate information to the controller node.

\* \* \* \* \*